Patented Aug. 19, 1952

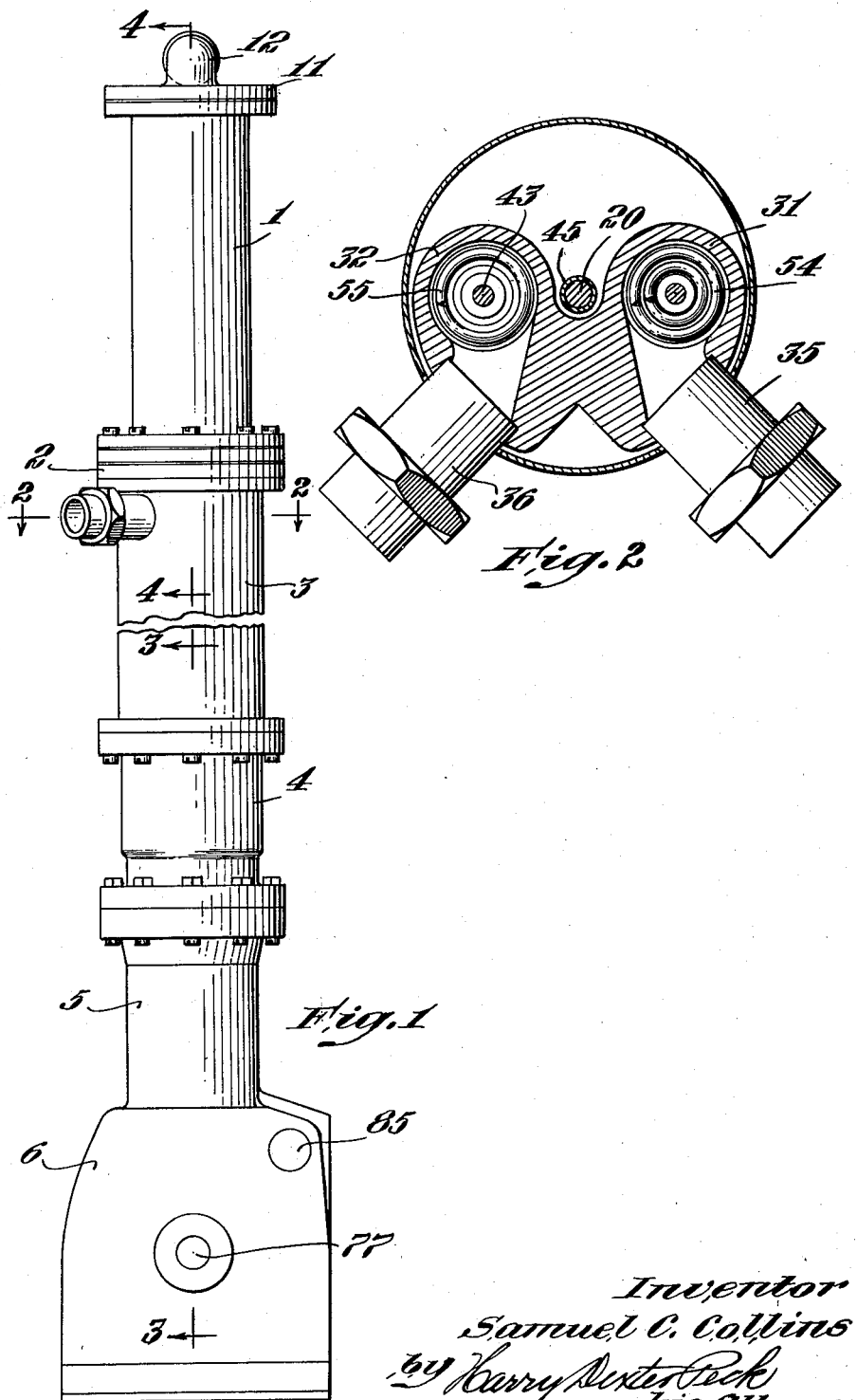

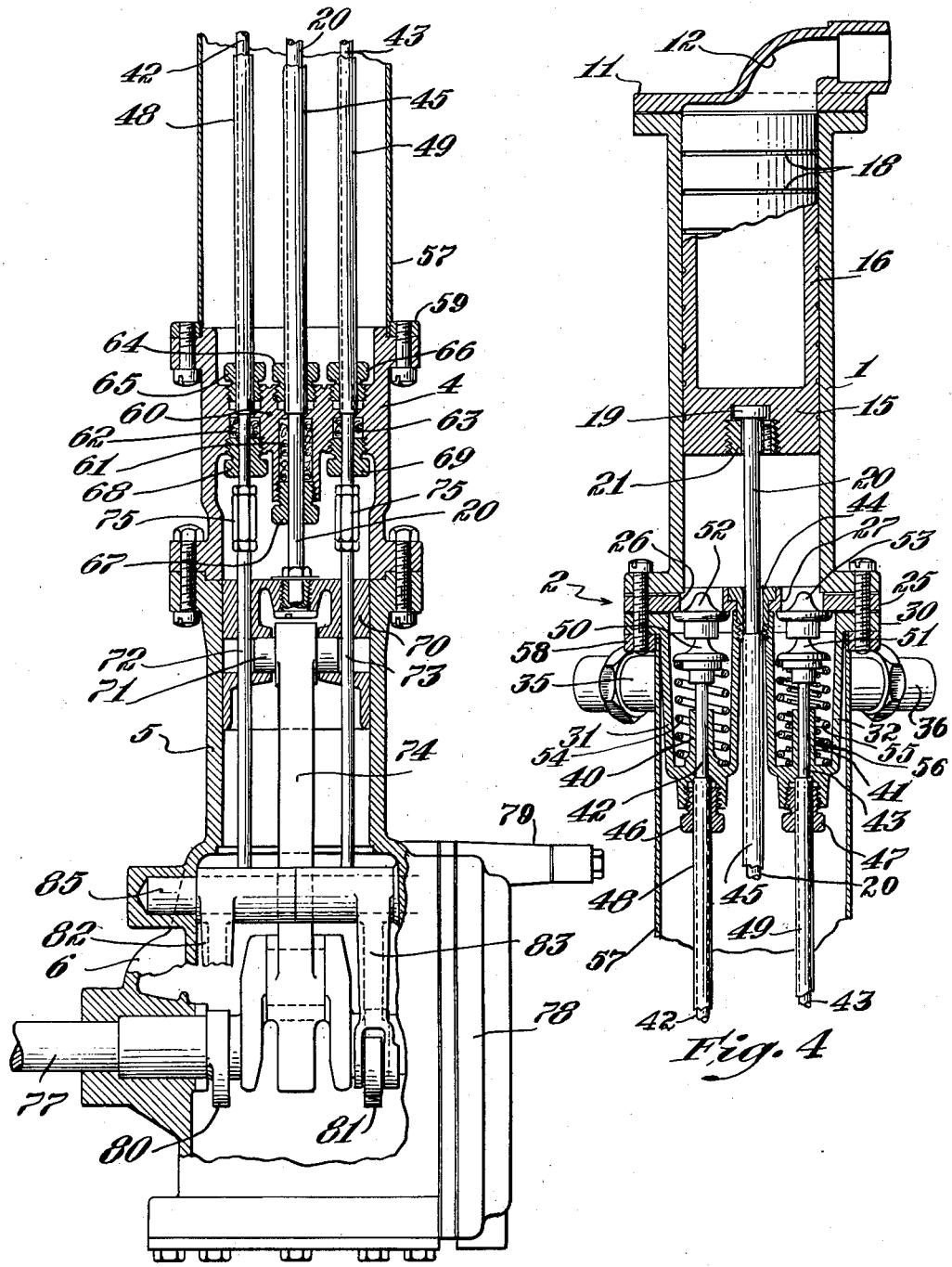

2,607,322

UNITED STATES PATENT OFFICE 2,607,322

EXPANSION ENGINE

Samuel C. Collins, Watertown, Mass., assignor, by mesne assignments, to Arthur D. Little, Inc., Cambridge, Mass., a corporation of Massachusetts Application April 26, 1946, Serial No. 665,206

6 Claims. (Cl. 121—117)

This invention relates to improvements in expansion engines. More especially it has to do with an engine for removing energy from a fluid under pressure. Such an engine is especially useful in connection with oxygen producing apparatus like that shown in my copending application Serial No. 661,253, filed April 11, 1946. It is also useful with refrigerating machines and with other apparatus where it is desired to change the conditions of a fluid under pressure by expending some of its energy in the actuation of an expansion engine.

The principal objects of the invention are to provide an expansion engine which is designed so as to insure a smooth and efficient operation at low temperatures, for example, temperatures at and below that of liquid air; which embodies a reciprocating piston and valve members which do not require the use of a lubricant and which do not show appreciable wear after long periods of use; and which employs flexible rods that, practically speaking, transmit only a pull.

Further objects relate to various features of construction and will be apparent from a consideration of the following description.

In accordance with the present invention, my expansion engine is of the single acting type and is equipped with a cylinder and a reciprocating piston which is free from rings, packing, etc., but preferably formed with spaced circumferential grooves. Both the piston and the cylinder may be made either of the same wear-resistant metal or of different wear-resistant metals having substantially the same coefficient of expansion. In either case the piston should have with respect to the cylinder a diametrical clearance (cylinder diameter minus piston diameter) which may vary from a minimum of approximately 0.0003" to a maximum of approximately 0.001" per inch of piston diameter, the optimum diametrical clearance being approximately 0.0005" per inch of piston diameter. The piston is connected to the usual cross-head of a crank and connecting rod mechanism, or an equivalent, by a flexible connecting rod capable of being flexed as distinguished from the relatively rigid conventional connecting rods which are designed to receive and transmit both compressive and tension forces without undergoing appreciable flexing action. One end of the flexible connecting rod is connected to the end of the piston on which the compressed fluid acts by a connection which permits a slight universal rocking or tipping, and also, desirably, a bodily transverse movement of the piston relative to the adjacent end of the connecting rod so that the piston is at all times free to center itself within the cylinder during reciprocation.

The engine may be described as having five aligned sections, one constituting the cylinder in which is slideably supported the piston with the above specified clearance; a second section comprising an inlet and outlet valves assembly; a third section providing an elongated space constituting an insulating chamber in which is housed the valve assembly; a fourth section in which are packing means; and a fifth section which may be a crank case or other casing in which the cross-head reciprocates and has its movement transmitted to some suitable form of power utilizing means.

The valves are adjacent to the cylinder and are preferably of the normally closed, self-centering type which are opened by cam means acting through suitable mechanism including flexible pull rods which facilitate the self-centering of the valves. In the preferred design the flexible connecting rod from the piston and the flexible pull rods from the valves each extends through the insulating chamber within an elongated tube which at one end has a sealed joint with the element to which it is connected and at its other end is sealed against leakage by suitable packing means. This novel arrangement of valves, rods and packing means is effective to prevent objectionable leakage of the fluid passing through the engine.

As herein shown the reciprocating movement of the cross-head is transmitted by a crank to a rotating shaft on which (not shown) may be mounted a fly-wheel, pulley, gear or the like for transmittal of power to do some useful work, or the shaft may be connected with any suitable form of braking means capable of absorbing and dissipating the energy taken from the fluid which actuates the engine.

Referring to the accompanying drawings wherein I have shown what is now considered a preferred embodiment of the invention:

Fig. 1 is an elevation of an expansion engine constructed in accordance with the present invention;

Fig. 2 is an enlarged section on the line 2—2 of Fig. 1, but with the parts shown turned 90° counter-clockwise from their positions in Fig. 1;

Fig. 3 is an enlarged vertical section through the lower part of the engine, on the line 3—3 of Fig. 1; and Fig. 4 is an enlarged vertical section through the upper part of the engine on the line 4—4 of Fig. 1.

The expansion engine, as shown in Fig. 1, comprises a section 1 constituting a cylinder, a section 2 which comprises the valve assembly, a section 3 providing space for thermal insulation, and in which the greater part of the valve assembly is enclosed, a section 4 in which are packing means, and a section 5 in which reciprocates a cross-head whose motion is transmitted to mechanism housed in a crank case 6.

One end of the cylinder 1 (see Fig. 4) is provided with a head 11 having a breather passage 12, and slidably mounted within the cylinder is a piston 15 having an elongate skirt portion 16 formed with spaced circumferential grooves 18 which are operative not only to entrap fluid tending to escape between the piston and cylinder, but also to distribute the pressure in the clearance space between the piston and cylinder, thereby insuring proper centering of the piston during operation. The portion of the cylinder below the head of the piston 15 provides an expansion or working chamber into which fluid is admitted to do work on the piston during its upward stroke and from which chamber the fluid is discharged during the downward stroke. The portion of the cylinder above the piston and the hollow space within the skirt 16 constitute a surge chamber directly communicating with the breather passage 12. Both the piston and the cylinder are preferably of the same wear-resistant metal, the alloy of iron, chromium, molybdenum and aluminum, which is sold under the trade name "Nitralloy" having been found to give superior results when hardened, ground and polished so that the diametrical clearance between the piston and cylinder is between 0.0003" and 0.0010" for a piston having a diameter of two inches.

The head of the piston 15 is formed with a central threaded opening which receives with clearance the flanged end 19 of a flexible connecting rod 20 and a bushing or like member 21 which anchors the flanged end of the connecting rod to the piston. The construction and arrangement are such that while substantial longitudinal play is prevented there is freedom for a slight universal tipping and for a slight bodily transverse movement of the piston 15 relative to the end of the connecting rod 20. This allows the piston to center itself when reciprocating and thus overcomes the danger of creating lateral stresses due to slight misalignment of parts. The connecting rod 20 is preferably a 1/4" diameter stainless steel rod, and is operative only to transmit tension or pull.

The valve assembly 2 comprises a circular plate 25 fitting against a flanged end of the cylinder 1 and formed with an intake port 26, an exhaust port 27 and a central opening through which the connecting rod 20 extends. Beneath the plate 25 is a valve housing 30 consisting of an aluminum casting formed with a pair of depending socket-like casings 31 and 32 registering with the ports 26 and 27, respectively, the casings 31 and 32 communicating (see Fig. 2) with bronze manifolds 35 and 36, respectively. If desired, the breather passage 12 may be connected to the exhaust manifold 36 or to a conduit connected therewith, so as to recover any gaseous fluid leaking past the piston. The lower ends of the casings 31 and 32 are formed with sleeve-like guides 40 and 41 which slidably support flexible pull rods 42 and 43, both of which are preferably of stainless steel similar to connecting rod 20.

At the center of the housing 30 is a threaded opening which receives a bushing 44 which extends through the plate 25 and has a flanged head which seats in a suitable socket in the plate and secures the plate and housing together at their middle portions. The shank of the bushing 44 is soldered or otherwise secured to a stainless steel tubular casing 45 which extends downward to packing means in section 4 of the engine (see Fig. 3). Similarly, the lower ends of the casings 31 and 32 are provided with threaded apertures which receive bushings 46 and 47, to which are soldered tubular casings 48 and 49 which surround the pull rods 42 and 43, respectively. Thus the upper end of each casing, 45, 48 and 49, has a fluid tight joint with an associated bushing.

The piston rod 20 reciprocates in the bushing 44 and casing 45. The bore of the bushing and the internal space of the casing being sufficiently large, compared to the diameter of the piston rod, to permit any flexure of this rod necessary to insure the proper positioning of the piston in the cylinder.

The upper ends of the pull rods 42 and 43 carry ball and socket joints 50 and 51 which respectively support self-centering valves 52 and 53 in a manner to permit the valves to seat squarely on the surface of the plate 25 around the edges of the ports 26 and 27. Stainless steel coil compression springs 54 and 55 surround the pull rods 42 and 43 within the casings 31 and 32, with their lower ends resting on the bottom of these casings and with their upper ends acting on the ball and socket joints 50, 51 respectively. These springs 54 and 55 always urge the valves toward their seats, and in casing 32 there is an additional spring 56 which adds sufficient seating force on valve 53 to maintain it seated when valve 52 is opened and the maximum pressure is present in the expansion chamber of the cylinder.

A thin-walled stainless steel spacer and enclosure member 57, of some ten or more inches in length for an engine having approximately a two-inch cylinder bore, has a ring 58 secured to one end to enable it to be clamped to the flange of the valve housing 30, and a similar ring 59 (see Fig. 3) at its other end enables the member to be clamped to the flange of the section 4 of the engine. This enclosure member provides a dead air space between the cylinder and valve assembly and the lower sections of the engine, and serves as an effective insulation to prevent heat generated by the moving parts below from passing to the fluid flowing through the engine.

Referring to Fig. 3, the section 4 comprises a partition 60 formed with three openings 61, 62 and 63, respectively aligned with the casings 45 and 48 and 49. The upper ends of the openings are threaded to receive bushings 64, 65 and 66 which fit rather tightly about their respective casings and the lower ends of these openings are likewise threaded to receive bushings 67, 68 and 69 (provided with openings) through which the rods 20, 42 and 43 extend, the design being such as to insure a close sliding fit between these parts. In addition, in the space above each lower bushing 67, 68 and 69 is suitable packing material which cooperates with the several bushings to prevent appreciable leakage about the connecting and pull rods.

The end of the connecting rod 20 remote from the piston 15 is rigidly secured in the manner shown to a cross-head 70 slidably mounted in the section 5 which merges into the crank case 6. The cross-head is formed with openings through which valve rods 72 and 73 extend, the upper ends of these valve rods being connected to the pull rods 42 and 43, respectively, by coupling members 75 which permit adjustment of the valves 52, 53. The cross-head 70 is provided with a wrist pin 71 to which is pivotally connected one end of a connecting rod 74, the other end of which is connected with a crank shaft 77. One end of this shaft projects outwardly from the crank case for connection with a flywheel, pulley or the like, and the opposite end of the crank shaft may be connected with a built-in differential planetary gear reduction 78 having an output shaft 79 which may be connected with a valve actuating mechanism such as is described in my aforesaid copending application.

The crank shaft 77 is formed with spaced valve cams 80 and 81 engageable with rollers carried by the depending ends of bell cranks 82 and 83 pivotally mounted to rock on shaft 85 supported within the crank case 6. The lower ends of the valve rods 72 and 73 are connected with the upper ends of the bell cranks in conventional manner, the design of the parts being such as to provide the desired valve opening and optimum timing for most efficient operation.

The embodiment herein shown is designed to receive air or other gaseous fluid at a pressure of the order of 150 pounds gauge and a temperature of the order of −230° F. and to discharge it at a pressure of from 5 to 70 pounds gauge. The normal operating speed of the engine is approximately 300 R. P. M. The piston 15 has a diameter and a stroke of two inches, giving a displacement of 6.28 cubic inches, and the connecting rod 74 has a length of about 4.9 inches, the crank throw being one inch and the valve movement being $\frac{3}{16}$ inch. Depending upon the amount of fluid to be admitted to the expansion chamber and the end conditions desired after the work done in the engine by the fluid is completed, the opening and closing of the control valves are timed to give the results desired.

The construction and arrangement herein shown is capable of giving entirely satisfactory results over long periods of use, and operating data indicate that the engine has a thermodynamic efficiency of from 80% to 90%, depending upon the particular operating conditions. Although such a high thermodynamic efficiency may result in condensation or liquefaction of the gas during the expansion cycle, such condensation does not interfere with the proper operation of the engine. It was found that after 2000 hours of operation no trace of wear could be detected on the piston or cylinder, a remarkable contrast with other engines embodying the use of piston rings, etc., which after a few hundred hours of operation produced such excessive wear and consequent leakage as to prohibit further efficient use.

The features of design to which such high efficiency and satisfactory performance are primarily attributable appear to include the low friction between moving parts disposed within the engine, the insulation of the heat-generating parts from the portion of the engine through which the fluid passes, and the fact that all members extending from such portions are made of metal having low thermal conductivity and small cross-sectional area. The smallness of the area is made possible because the arrangement of the rods is such that they are in tension rather than under longitudinal compression while transmitting all major forces.

While I have shown and described one desirable embodiment of the invention, it is to be understood that this disclosure is for the purpose of illustration and that various changes and modifications may be made without departing from the spirit and scope of the invention as set forth in the appended claims.

I claim:

1. An expansion engine comprising a crank case assembly including a crank shaft and cam means, a cylinder, a piston slidably fitting within said cylinder with a diametrical clearance between a minimum of 0.0003 inch and a maximum of approximately 0.001 inch per inch of piston diameter, a flexible connecting rod operatively connected at one end to said crank shaft and at its opposite end to said piston so as to transmit a pull between said piston and crank shaft, valve ports at one end of said cylinder, self-centering normally closed valves associated with said ports, and flexible pull rods connecting said valves and cam means, the said pull rods and the connecting rod being connected to said valves and piston, respectively, by joints permitting a universal-like movement of said valves and piston relative to their associated rods.

2. An expansion engine comprising a crank, an elongate cylinder having a closed outer end and an inner end, a piston having a side wall fitting within said cylinder with a diametrical clearance between a minimum of 0.0003 inch and a maximum of approximately 0.001 inch per inch of piston diameter, an intake port and an exhaust port at said inner end of said cylinder, a flexible connecting rod extending through the inner end of said cylinder and operatively connecting the head of said piston and said crank shaft by joints permitting said piston to center itself when reciprocating within said cylinder, thereby to permit the transmission of a pull between said crank and piston, and a breather port at the closed end of said cylinder.

3. An expansion engine as set forth in claim 2, wherein said breather port and exhaust port are connected to an exhaust manifold so that fluid which passes between said cylinder and piston is discharged into said manifold.

4. An expansion engine as set forth in claim 2, wherein the side wall of said piston defines an elongate skirt extending from the head of said piston in a direction opposite that of said connecting rod.

5. An expansion engine as set forth in claim 2, wherein both the piston and cylinder are of wear-resistant material having substantially the same coefficient of expansion.

6. An expansion engine as set forth in claim 2, wherein an elongate spacer is interposed between the inner end of said cylinder and said crank.

SAMUEL C. COLLINS.

REFERENCES CITED

The following references are of record in the file of this patent:

UNITED STATES PATENTS

| Number | Name | Date |
|---|---|---|
| 670,773 | Fredericks | Mar. 26, 1901 |
| 761,339 | Thomas | May 31, 1904 |
| 1,106,930 | Desmond | Aug. 11, 1914 |
| 1,491,797 | Harrison | Apr. 29, 1924 |
| 1,611,159 | Buvinger et al. | Dec. 21, 1926 |
| 1,927,617 | Schmidt | Sept. 19, 1933 |
| 2,113,149 | Wiegand | Apr. 5, 1938 |
| 2,291,243 | Levy | July 28, 1942 |

FOREIGN PATENTS

| Number | Country | Date |
|---|---|---|
| 7,986 | Great Britain | Mar. 30, 1911 |